Patented May 9, 1950

2,506,903

UNITED STATES PATENT OFFICE 2,506,903

SYNTHETIC WAX

Herschel G. Smith, Wallingford, and Troy L. Cantrell, Lansdowne, Pa., assignors to Gulf Oil Corporation, Pittsburgh, Pa., a corporation of Pennsylvania No Drawing. Application August 16, 1948,
Serial No. 44,577

17 Claims. (Cl. 260—410.5)

This invention relates to synthetic waxes, and more particularly to higher fatty acid esters of soluble, fusible phenol-formaldehyde condensation products. The synthetic waxes of this invention are particularly adapted for use in greases, polishing compositions and mineral lubricating oils.

It is an object of this invention to prepare oil soluble, substantially neutral esters of phenol resins by simple esterification of the free hydroxyl groups of the resin with higher fatty acids.

It is a further object of this invention to provide compositions of matter having waxy characteristics at ordinary room temperatures, good stability, and substantial solubility in oils, particularly mineral lubricating oils.

It is a still further object of this invention to provide an improved and simple method for obtaining such waxy compositions.

In U. S. Patent 2,091,965, there is described a phenol resin ester which is prepared by heating a mixture of a fusible, soluble phenolic resin, a higher fatty acid and an anhydride of an organic carboxylic acid boiling below 190° C., such as acetic anhydride. In accordance with said patent, the phenol resins employed are prepared from formaldehyde and the simple phenols, such as phenol, the cresols and the xylenols, and it is necessary to employ a relatively low boiling organic acid anhydride in esterifying such resins with higher fatty acids in order to obtain oil soluble products having low acid numbers. According to the patent, simple esterification of the free hydroxyl groups of the resin (i. e., without use of the anhydride) yields high acid number products which are not oil soluble.

Contrary to the teachings of the prior art, we have found that when the fusible, soluble phenol-formaldehyde condensation product is prepared from a mono-alkylated phenol having from 4 to 12 carbon atoms in the alkyl substituent, the condensation product may be esterified with higher fatty acids by simple esterification without the use of a low boiling organic acid anhydride. Accordingly, the objects of our invention are attained by preparing, as new products, substantially neutral higher fatty monocarboxylic acid esters of a fusible, soluble mono-alkylated phenol-formaldehyde condensation product, the higher fatty acid being a saturated or mono-olefinic fatty acid having at least 8 carbon atoms, and the alkyl substituent of the mono-alkylated phenol having from 4 to 12 carbon atoms. These products are soluble in mineral lubricating oils and have many of the characteristics of natural waxes. They provide a cheap substitute for such natural waxes. Furthermore, they are of particular utility in stabilizing mineral oil lubricating greases to prevent "bleeding" of the mineral oil and to retain the structure of the greases.

As has been stated, the alkyl substituent of the mono-alkylated phenols employed in preparing our synthetic waxes have from 4 to 12 carbon atoms. A preferred group of the mono-alkylated phenols are those prepared by alkylating phenol with an olefin having from 4 to 12 carbon atoms in the presence of a concentrated sulfuric acid catalyst, preferably in accordance with the disclosure of U. S. Patent 2,149,759 to Cantrell. According to said patent, phenol is mixed with from 1 to 10 per cent of sulfuric acid having a strength of 60 to 100 per cent, or even fuming sulfuric acid, and an olefin or a mixture of olefins (as present in refinery gas, for example) is passed through the liquid mixture. The reaction temperature is controlled so as not to exceed 220° F. The alkylated phenol or mixtures of alkylated phenols so obtained may then be washed with water and dilute caustic soda solution to remove the sulfuric acid catalyst. However, it is a feature of our invention that the sulfuric acid need not be removed, but that the resulting impure alkylated product may be directly subjected to condensation with formaldehyde, as will be more fully described hereinbelow.

Representative olefins or olefin-containing materials which may be employed for the alkylation of phenol are butene-1, isobutylene, the amylenes, refinery gas, diisobutylene and triisobutylene. The use of diisobutylene is preferred since the alkylated phenol obtained is primarily para-(alpha, alpha, gamma, gamma) tetramethylbutyl phenol, which is particularly useful in our invention.

It should be understood that our invention is not limited to the secondary or tertiary mono-alkylated phenols obtained by alkylating phenol with an olefin having from 4 to 12 carbon atoms. Thus, the n-alkyl phenols having from 4 to 12 carbon atoms in the alkyl substituent, prepared by alkylating phenol with an n-alkyl halide in the presence of a Friedel-Crafts catalyst such as aluminum chloride, may also be employed. Our invention therefore contemplates the use of any mono-alkylated phenol having from 4 to 12 carbon atoms in the alkyl substituent.

Included among the mono-alkylated phenols which are useful in our invention are n-butyl phenol, sec-butyl phenol, tert-butyl phenol, n- amyl phenol, sec-amyl phenol, tert-amyl phenol, n-hexyl phenol, n-octyl phenol, (alpha, alpha, gamma, gamma) tetramethylbutyl phenol, triisobutyl phenol, and mixtures thereof.

The use of alkylated phenols having an alkyl substituent of less than 4 carbon atoms is not satisfactory because (1) the resulting esterified condensation products prepared from such phenols are not sufficiently soluble in mineral lubricating oils and mineral oil lubricant compositions to serve the functions of an efficient additive and (2) it is difficult to secure substantially neutral, oil-soluble products by simple esterification of the phenol-formaldehyde condensation product and the higher fatty acid. Similarly, if the alkyl substituent of the alkylated phenol exceeds 12 carbon atoms, the resulting esterified condensation products tend to be unstable and to become insoluble in mineral oils.

In accordance with our invention, the above described mono-alkylated phenol is condensed in conventional manner with formaldehyde to produce a fusible, soluble alkylated phenol-formaldehyde condensation product. The mol ratio of alkylated phenol to formaldehyde varies from 1:1 to 1:2. Either alkaline or acid condensing agents may be employed, as will be understood in the art. The resulting condensation product is then dehydrated in the usual manner. When an alkylated phenol containing the sulfuric acid catalyst employed in its preparation is used, the same sulfuric acid acts as a condensing agent in the condensation of the alkylated phenol.

The fusible, soluble alkylated phenol-formaldehyde condensation product is then mixed with a higher fatty saturated or mono-olefinic mono-carboxylic acid containing at least 8 carbon atoms and the mixture is heated, whereby the free hydroxyl groups of the alkylated phenol-formaldehyde condensation product are esterified by the higher fatty acid to produce the substantially neutral waxy esters of our invention. The fatty acid is employed in equimolar amounts with the alkylated phenol used in making the alkylated phenol-formaldehyde condensation product. In general, the esterification reaction is conducted at a temperature not in excess of 500° F. Conventional esterification catalysts, such as sulfuric acid and p-toluene sulfonic acid, may be employed.

Suitable fatty monocarboxylic acids having at least 8 carbon atoms are the saturated and the mono-olefinic fatty acids. A preferred group of fatty acids are the fatty acids of from 8 to 32 carbon atoms. The saturated fatty acids include caprylic, pelargonic, capric, undecylic, lauric, myristic, palmitic, stearic, arachidic, behenic, carnaubic, cerotic, melissic and psyllaic acids. The mono-olefinic fatty acids include nonylenic, decylenic, undecylenic, oleic, ricinoleic, erucic and brassidic acids. Mixtures of fatty acids having at least 8 carbon atoms, as obtained from the saponification of fats and fatty oils for example, may also be employed. Naphthenic acids and Hydrofol acids (hydrogenated fish oil fatty acids) are also suitable saturated fatty acids.

When the fatty acid has less than 8 carbon atoms, the esterified condensation products tend to become hard and brittle and of poor solubility in mineral oils. These effects increase as the length of the fatty acid chain decreases. Accordingly, the fatty acid must have at least 8 carbon atoms.

The following examples are illustrative of our invention.

*Example I* a. *Preparation of alkylated phenol.*—Into a suitable reaction vessel equipped with a stirrer and means for heating and cooling, there were charged 112 pounds (1 pound mol) of octylene (commercial diisobutylene) and 94 pounds (1 pound mol) of phenol. Agitation was begun and 10 pounds of 96% sulfuric acid were gradually added. The temperature of the reaction was so controlled that it did not exceed 220° F. The resulting product was primarily para-(alpha, alpha, gamma, gamma) tetramethylbutyl phenol.

b. *Preparation of alkylated phenol-formaldehyde condensation product.*—To the alkylated phenol in the same reaction vessel and still containing the sulfuric acid, there were added 160 pounds of a 37% by weight aqueous formaldehyde solution (2 pound mols of anhydrous formaldehyde). The mixture was agitated and heated to 160° F., and the temperature gradually increased to 220° F. until all of the formaldehyde was consumed. The temperature was then raised to 300° F. to dehydrate the condensation product.

c. *Esterification of alkylated phenol-formaldehyde condensation product.*—To the dehydrated alkylated phenol-formaldehyde condensation product, there were then added 284 pounds (1 pound mol) of stearic acid and the mixture was agitated and heated to 400° F. until esterification was substantially complete as evidenced by the formation of no more water. The product was then permitted to cool. The product was a light-brownish waxy material, resembling beeswax in odor and appearance. It had the following properties:

Specific gravity, solid state_____ 1.11
Melting point: °F., capillary tube_____ 108-120
Neutralization No_____ 8.6

*Example II*

Into a suitable reaction vessel equipped for heating and cooling, there were charged 56 pounds (1 pound mol) of commercial isobutylene and 94 pounds (1 pound mol) of phenol. The vessel was kept closed to prevent loss of the butylenes. While agitating, 10 pounds of 96% sulfuric acid were gradually added. The temperature was so controlled that it did not exceed 220° F. The resulting product was primarily para-tertiary butyl phenol.

To the alkylated phenol in the same reaction vessel and still containing the sulfuric acid, there were added 160 pounds of a 37% by weight aqueous formaldehyde solution (2 pound mols of anhydrous formaldehyde). The mixture was agitated and heated to 160° F. and the temperature gradually increased to 220° F. until all of the formaldehyde was consumed. The temperature was then raised to 300° F. to dehydrate the condensation product.

To the dehydrated alkylated phenol-formaldehyde condensation product, there were then added 284 pounds (1 pound mol) of stearic acid and the mixture was agitated and heated to 400° F. until esterification was substantially complete, as evidenced by the formation of no more water. The product was then permitted to cool. The product was a waxy material having the following properties:

Specific gravity, solid state_____ 0.980
Melting point: °F., capillary tube_____ 140
Neutralization No_____ 0.20

While the above examples are specific to tertiary butyl phenol and octyl phenol and to stearic acid, it is not intended to limit the invention to these compounds since any of the other mono-alkylated phenols and fatty acids disclosed herein may be substituted for the specific compounds of the examples with good results.

The higher fatty monocarboxylic acid esters of an alkylated phenol-formaldehyde condensation product of our invention are useful in polishing compositions and especially as additives in the manufacture of compounded mineral oil lubricant compositions. When added in small amounts, say from 0.1 to 1.0 per cent by weight, to a turbine oil, rusting of metal parts lubricated by said turbine oil is substantially inhibited. When added in small amounts, from 0.1 to 5.0 per cent by weight, to a grease, the esters of our invention have the surprising functions of improving the resistance of the grease to oxidation and water solvency, and of stabilizing the grease against oil separation ("bleeding") and structural breakdown at increased temperatures. The use of our new esters in greases is described and claimed in our continuation-in-part application Serial No. 94,251, filed May 19, 1949.

The following example illustrates the use of our new esters.

*Example III*

A lubricating grease was prepared from the following materials:

Make-up, per cent by weight:

| | |
|---|---|
| 500/2.5 Texas oil (500 SUV at 100° F.) | 73.8 |
| 150 MC Bright Stock (150 SUV at 210° F.) | 6.4 |
| Calcium soap of hydrofol fatty acids | 18.5 |
| Excess alkali calculated as Ca(OH)$_2$ | 0.1 |
| Ester of Example I, supra | 1.2 |

The above grease had the following properties:

Inspection:

| | |
|---|---|
| Dropping point, °F.— | |
| ASTM D566–42 | 246 |
| Flow point, °F.— | |
| Navy Spec. 14–G–1d | 295 |
| Penetration, ASTM D217–44 T— | |
| 77° F., 150 grams, 5 sec.: | |
| Unworked | 177 |
| Worked | 254 |
| Free acidity as oleic acid, per cent | 0.09 |
| Water absorption, AN–G–3a, percent | 70 |
| Mineral oil content, percent by weight | 80.2 |
| Freezing point, °F— | |
| AAR M–914–42 | −50 |
| Oxidation test, ASTM D942–47 T— | |
| 176° F., 500 hr. | Passes |
| Pressure drop, lbs. | 3 |
| Oil separation, 175° F, per cent— | |
| AAR M–914–42 | Nil |

As may be seen from the above example, the addition of the ester of our invention did not affect the beneficial properties of the grease and, at the same time, improved its stability against oil separation and oxidation.

Resort may be had to such modifications and variations as fall within the spirit of the invention and the scope of the appended claims.

What we claim is:

1. A composition of waxy character comprising a substantially neutral higher fatty monocarboxylic acid ester of a fusible, soluble mono-alkylated phenol - formaldehyde condensation product, the higher fatty acid being selected from the class consisting of saturated and mono-olefinic fatty acids having at least 8 carbon atoms, and the alkyl substituent of the alkylated phenol having from 4 to 12 carbon atoms.

2. The composition of claim 1, wherein the higher fatty acid is a saturated fatty acid.

3. The composition of claim 1, wherein the higher fatty acid is a mono-olefinic fatty acid.

4. A composition of waxy character comprising a substantially neutral higher fatty monocarboxylic acid ester of a fusible soluble mono-alkylated phenol - formaldehyde condensation product, the higher fatty acid being selected from the class consisting of saturated and mono-olefinic fatty acids having from 8 to 32 carbon atoms, and the alkyl substituent of the alkylated phenol having from 4 to 12 carbon atoms; the mol ratio of alkylated phenol to formaldehyde in the alkylated-phenol formaldehyde condensation product varying from 1:1 to 1:2.

5. A composition of waxy character comprising a substantially neutral higher fatty monocarboxylic acid ester of a fusible, soluble, mono-alkylated phenol - formaldehyde condensation product, the higher fatty acid being selected from the class consisting of saturated and mono-olefinic fatty acids having from 8 to 32 carbon atoms, and the alkylated phenol being (alpha, alpha, gamma, gamma) tetramethylbutyl phenol.

6. A composition of waxy character comprising a substantially neutral higher fatty monocarboxylic acid ester of a fusible, soluble mono-alkylated phenol - formaldehyde condensation product, the higher fatty acid being selected from the class consisting of saturated and mono-olefinic fatty acids having from 8 to 32 carbon atoms, and the alkylated phenol being tertiary butyl phenol.

7. A composition of waxy character comprising a substantially neutral stearic acid ester of a fusible, soluble (alpha, alpha, gamma, gamma) tetramethylbutyl phenol-formaldehyde condensation product.

8. A composition of waxy character comprising a substantially neutral stearic acid ester of a fusible, soluble tertiary butyl phenol-formaldehyde condensation product.

9. The process which comprises condensing a mono-alkylated phenol having from 4 to 12 carbon atoms in the alkyl substituent with formaldehyde to form a fusible, soluble alkylated phenol-formaldehyde condensation product, and esterifying said condensation product with a higher fatty monocarboxylic acid selected from the class consisting of saturated and mono-olefinic fatty acids having at least 8 carbon atoms to form a substantially neutral waxy product.

10. The process of claim 9, wherein the higher fatty acid is a saturated fatty acid.

11. The process of claim 9, wherein the higher fatty acid is a mono-olefinic fatty acid.

12. The process which comprises mono-alkylating phenol with an olefinic hydrocarbon of from 4 to 12 carbon atoms in the presence of a catalytic amount of sulfuric acid, subjecting the crude alkylated product containing said sulfuric acid to condensation with formaldehyde to form a fusible, soluble alkylated phenol-formaldehyde condensation product, and esterifying said condensation product with a higher fatty monocarboxylic acid selected from the class consisting of saturated and mono-olefinic fatty acids having at least 8 carbon atoms to form a substantially neutral waxy product.

13. The process which comprises condensing with from 1 to 2 mols of formaldehyde 1 mol of a mono-alkylated phenol having from 4 to 12 carbon atoms in the alkyl substituent to form a fusible, soluble alkylated phenol-formaldehyde condensation product, and esterifying said condensation product at a temperature not exceeding 500° F. with a higher fatty monocarboxylic acid selected from the class consisting of saturated and mono-olefinic fatty acids having from 8 to 32 carbon atoms to form a substantially neutral waxy product.

14. The process which comprises condensing with from 1 to 2 mols of formaldehyde 1 mol of (alpha, alpha, gamma, gamma) tetramethylbutyl phenol to form a fusible, soluble condensation product, and esterifying said condensation product at a temperature not exceeding 500° F. with a higher fatty monocarboxylic acid selected from the class consisting of saturated and mono-olefinic fatty acids having from 8 to 32 carbon atoms to form a substantially neutral waxy product.

15. The process of claim 14, wherein the fatty acid is stearic acid.

16. The process which comprises condensing with from 1 to 2 mols of formaldehyde 1 mol of tertiary butyl phenol to form a fusible, soluble condensation product, and esterifying said condensation product at a temperature not exceeding 500° F. with a higher fatty monocarboxylic acid selected from the class consisting of saturated and mono-olefinic fatty acids having from 8 to 32 carbon atoms to form a substantially neutral waxy product.

17. The process of claim 16, wherein the fatty acid is stearic acid.

HERSCHEL G. SMITH.
TROY L. CANTRELL.

REFERENCES CITED

The following references are of record in the file of this patent:

UNITED STATES PATENTS

| Number | Name | Date |
| --- | --- | --- |
| 2,058,797 | Honel | Oct. 27, 1936 |
| 2,165,380 | Honel | July 11, 1939 |